(12) United States Patent
Osten et al.

(10) Patent No.: US 6,542,939 B1
(45) Date of Patent: Apr. 1, 2003

(54) METHOD AND APPARATUS FOR STORING VOLUMETRIC VITAL PRODUCT DATA (VPD) IN MEMORY ASSOCIATED WITH A CONNECTOR OR CONNECTOR BOARD

(75) Inventors: Thomas James Osten, Rochester, MN (US); Paul Edward Movall, Rochester, MN (US); Neil Clair Berglund, Kasson, MN (US); Nancy Marie Uthke-Schmucki, Eyota, MN (US); Patrick Allen Buckland, Austin, TX (US); David Lee Dosch, Rochester, MN (US); Stephen Peter Mroz, Rochester, MN (US); David G. Lund, Byron, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/371,506

(22) Filed: Aug. 10, 1999

(51) Int. Cl.⁷ ........................... G06F 13/14; G06F 13/20
(52) U.S. Cl. ............................. 710/15; 710/16; 710/43; 710/52
(58) Field of Search .............................. 710/15, 16, 43, 710/52

(56) References Cited

U.S. PATENT DOCUMENTS

| | | | | |
|---|---|---|---|---|
| 4,650,333 A | * | 3/1987 | Crabb et al. | 356/376 |
| 5,371,644 A | * | 12/1994 | Hoge et al. | 360/132 |
| 5,699,440 A | * | 12/1997 | Carmeli | 382/100 |

FOREIGN PATENT DOCUMENTS

| | | | | |
|---|---|---|---|---|
| JP | 406102967 A | * | 4/1994 | G06F/1/16 |
| JP | 410228341 A | * | 8/1998 | G06F/3/00 |

OTHER PUBLICATIONS

Berglund et al., Application Ser. No. 08/971,687 (RO997–154, IBM–108), filed Nov. 17, 1997, "Method and Apparatus for Correlating Computer System Device Physical Location with Logical Address".

Berglund et al., Application Ser. No. 09/262,023 (RO998–232, IBM–125), filed Mar. 4, 1999, "Method for Reassigning Slot Labels Based on Vital Product Data (VPD)".

Movall et al., Application Ser. No. 09/265,394 (RO998–233, IBM–126), filed Mar. 10, 1999, "Addition of Slot, Backplane, Chassis and Device Parametric Properties to Vital Product Data (VPD) in a Computer System".

* cited by examiner

*Primary Examiner*—Jeffrey Gaffin
*Assistant Examiner*—Rehana Perveen
(74) *Attorney, Agent, or Firm*—Christopher H. Lynt; Matthew J. Bussan

(57) ABSTRACT

In an electrical system having a connector board with at least one electrical connector thereon for receiving an electrical device therein, volumetric vital product parametric data is stored in memory associated with the connector board. The stored volumetric vital product parametric data can be accessed with the electrical system to check for available space for a proposed electrical device, for example. The stored data may include information about dimensional characteristics of the connector board and the at least one electrical connector. This data can be compared with corresponding data for the electrical device to determine compatibility, for example.

22 Claims, 12 Drawing Sheets

| EEPROM ADDRESS | LOGICAL BUS ADDRESS | PHYSICAL LABEL | Other Slot Characteristics |
|---|---|---|---|
| PCI Backplane Slot Example | | | |
| 105 | HostBus=a, LocalBus=b, IDSEL=a | | |
| 106 | HostBus=a, LocalBus=b, IDSEL=c | C14 | |
| 107 | HostBus=a, LocalBus=c, IDSEL=a | C15 | |
| 108 | HostBus=a, LocalBus=c, IDSEL=c | D01 | |
| | | D02 | |

FIG. 5A

| EEPROM ADDRESS | LOGICAL BUS ADDRESS | PHYSICAL LABEL | Other Slot Characteristics |
|---|---|---|---|
| DASD Backplane Slot Example | | | |
| 32 | SCSI ID = a | C14 | |
| 33 | SCSI ID = b | C15 | |
| 34 | SCSI ID = c | D01 | |
| 35 | SCSI ID = d | D02 | |

FIG. 5B

| Connector | Origin Displacement | Adjacency Displacement |
|---|---|---|
| 1 | -1 | 2 |
| 2 | -1 | 2 |
| 3 | -1 | 3 |
| 4 | -2 | 3 |
| 5 | -1 | 2 |
| 6 | -1 | 3 |
| 7 | -2 | 3 |
| 8 | -1 | 3 |
| 9 | -2 | 3 |

FIG. 6B

METHOD AND APPARATUS FOR STORING VOLUMETRIC VITAL PRODUCT DATA (VPD) IN MEMORY ASSOCIATED WITH A CONNECTOR OR CONNECTOR BOARD

CROSS-REFERENCE TO RELATED APPLICATIONS

This application is related to co-pending applications:

"METHOD AND APPARATUS FOR CORRELATING COMPUTER SYSTEM DEVICE PHYSICAL LOCATION WITH LOGICAL ADDRESS" Ser. No. 08/971,687 filed Nov. 17, 1997 now U.S. Pat. No. 6,044,411;

"METHOD FOR REASSIGNING SLOT LABELS BASED ON VITAL PRODUCT DATA (VPD)" Ser. No. 09/262,023 filed Mar. 4, 1999 now U.S. Pat. No. 6,427,176;

"ADDITION OF SLOT, BACKPLANE, CHASSIS AND DEVICE PARAMETRIC PROPERTIES TO VITAL PRODUCT DATA (VPD) IN A COMPUTER SYSTEM" Ser. No. 09/265,394 filed Mar. 10, 1999 now U.S. Pat. No. 6,289,405.

BACKGROUND OF THE INVENTION

1. Field of The Invention

The invention relates to the field of computer systems, and in particular, to compatibility and related issues, for example, between a computer slot and a candidate device intended to be plugged into that slot.

2. Background Information

Recently it has become common to configure computer systems using motherboards and/or backplanes having a number of slot connectors (or simply "slots" herein) for receiving a variety of add-on adapter card devices. In many computer systems, input/output (I/O) interfacing and various special purpose circuitry is provided using these add-on adapter cards which conveniently and simply plug-in to standard bus connectors on the main processor motherboard or backplane.

The cards typically have edge connectors with a number of relatively closely spaced metal contacts, on one or both sides of the card edge, and the corresponding slots similarly have a like number of closely spaced metal contacts therein. When the card edge connector is inserted in the slot connector, the corresponding contacts make electrical connection. Through these contacts and their electrical connection, the card device and the board system, e.g., a personal computer, communicate data, address and control signals, for example. The card device also generally obtains electrical energy from the personal computer system through two or more of the contacts.

A variety of adapter/connector/bus types and standards are known, and one of these is the peripheral component interconnect (PCI) standard. The adapter/connector/bus types and standards may vary in a number of electrical characteristics. However, there can also be differences in the width, length or height clearance for card-slot electrical devices among the various available peripheral connectors and computer systems, depending on board layout, etc. For example, the PCI standard supports both a long card form factor and a short card form factor.

However, a particular system configuration may only permit a short card in a particular slot because of a lack of clearance with other installed system devices. That is, there may not be enough room for a long card in a particular slot. There may also be height clearances to consider for card devices that exceed the standard card device height, and width clearances as well.

Computer manufacturers are very concerned about configured system hardware costs. Therefore, many manufacturers are now designing system chassis and infrastructure based around industry standard architectures and devices. This allows the industry to leverage volume-of-scale in the marketplace when procuring hardware and electronics. Common devices and architectures today include the PCI (Card) and the 3.5" SCSI (DASD), for instance.

At the same time, manufacturers may try to differentiate their products and architectures within computer chassis to try to gain a marketable advantage. As a result, manufacturers sometimes develop non-standard devices and form-factors that ship as a 'feature' in a chassis otherwise optimized for standard components. Components subject to this are referred to as "featurable" herein.

However, this creates a coding headache for System Management (SM) developers who must try to describe, in a physical sense, how those 'features' can impact, in particular, interfere with, other adjacent slots or bays within the computer enclosure. In lieu of an efficient method for SM to handle these issues, Computer Manufacturing departments and Service organizations must maintain complex algorithms and/or 'configuration-tables' and documentation to describe 'supported' configurations given all the possible spatial combinations of standard and non-standard devices.

It is known to store vital product data (VPD) for correlating the physical locations of system components with their corresponding logical addresses in a computer system, for example, from co-pending patent application Ser. No. 08/971,687, filed Nov. 17, 1997, entitled "METHOD AND APPARATUS FOR CORRELATING COMPUTER SYSTEM DEVICE PHYSICAL LOCATION WITH LOGICAL ADDRESS" assigned to the same assignee as the present application (now U.S. Pat. No. 6,044,411). As described therein with respect to an exemplary embodiment, memory, e.g., non-volatile memory, is provided on a PCI backplane and written with VPD product information, such as the type of backplane, manufacture date, backplane serial number, type of slots on the backplane, etc., and this information is retained for use by the operating system if and when needed for service action, upgrades, or for on-line configuration management and order process.

Further, the VPD information may advantageously be written and accessed, for example, using a system power control network (SPCN), such as-an SPCN disclosed in U.S. Pat. No. 5,117,430 or in related co-pending application Ser. No. 08/912,561, filed Aug. 18, 1997, entitled "FAIL-SAFE COMMUNICATIONS NETWORK FOR USE IN SYSTEM POWER CONTROL" (now U.S. Pat. No. 6,122,256).

In co-pending application Ser. No. 09/265,394 filed Mar. 10, 1999, entitled "ADDITION OF SLOT, BACKPLANE, CHASSIS AND DEVICE PARAMETRIC PROPERTIES TO VITAL PRODUCT DATA (VPD) IN A COMPUTER SYSTEM" (now Pat. No. U.S. 6,289,405), the addition of slot, backplane, chassis and device parametric properties to vital product data (VPD) in a computer system is described. In particular, in an electrical system having a connector board with at least one electrical connector thereon for receiving an electrical device therein, a method includes storing vital product parametric data in memory associated with the connector board. The stored vital product parametric data can be accessed when information about the connector board and/or an electrical device therein is needed. The storing vital product parametric data may include storing information about characteristics of the connector board and the at least one electrical connector.

Further, if there are a plurality of connectors on the connector board, the storing physical characteristics includes storing a respective associated connector clearance for each of the plurality of connectors. For example, if a computer user has purchased a new DASD (direct access storage device) to plug into the computer, the computer user may know by looking at existing configuration records that there are five empty DASD slots available.

However, the computer user would also like to know without the need of taking the back cover off of the computer, which empty slots in this computer have 1.6" width spacing, required to accommodate the new DASD. It is typically the case in this particular computer system that there are mostly 1.0" spaced DASD connectors on the backplane. According to that disclosure, this information can be stored as VPD and accessed electronically. Ideally, according to that disclosure, the chassis and all devices and backplanes in a system would carry parametric VPD according to the invention. The chassis VPD would be compared with the backplane VPD, the chassis VPD would be compared with the device VPD, and the device VPD would be compared with the backplane device slot VPD to detect compatibility issues.

In view of the above background information, a need exists for providing additional spatial or 'volumetric' information about system components. In particular, it would be advantageous to have an automated way of determining more completely the spatial compatibility of devices and systems.

SUMMARY OF THE INVENTION

It is, therefore, a principle object of this invention to provide a method and apparatus which physically describes and stores location, orientation, interference data, and the volumetric geometry of respective components and component areas within a computer system.

It is another object of the invention to provide a method and apparatus that solves the above mentioned problems so that more spatial compatibility issues can be addressed more completely and automatically.

These and other objects of the present invention are accomplished by the method and apparatus disclosed herein.

According to an aspect of the invention, data which physically describes location, orientation, interference data, and the volumetric geometry of respective components and component areas is stored within a computer system, in particular, as volumetric vital product data (VPD) parameters.

According to an aspect of the invention, the components can be any and all physical devices found in the computer system which occupy space. For example, devices such as microprocessors, DASD, and I/O adapters, as well as chassis components, such as I/O backplanes, power supplies, regulators and blowers, for example. The component areas (e.g., slots) are device or component 'bays' within the computer.

According to another aspect of the invention, each device or component is modeled as a solid using multiple coordinate axes and references, and the component areas, e.g., slots, are modeled as 'envelopes' into which the solid is placed. The parameters used to define these models is referred to as the 'Volumetric VPD'.

An advantage of storing this type of information in a computer system, a computer chassis and/or a device, is that it allows the 'System Management' (SM) software to more completely and accurately describe and cross-check system hardware configuration, compatibility and capabilities.

According to another aspect of the invention, computer manufacturers' concerns about configured system hardware costs, and about designing system chassis and infrastructure based around industry standard architectures and devices are accommodated. At the same time, each manufacturer's desire to differentiate certain products and architectures within the computer chassis to try to gain a marketable advantage is accommodated, i.e., non-standard devices and form-factors that ship as a 'feature' in a chassis which is otherwise optimized for standard components can be accommodated. Advantageously, these are accommodated without the coding headache for SM developers who must try to describe, in a physical sense, how those 'features' impact and/or interfere with other adjacent slots or bays within the computer enclosure.

According to another aspect of the invention, an efficient method for SM to handle various problem issues is provided so that computer manufacturing, computer management and computer service organizations will no longer need to maintain complex algorithms and/or 'configuration-tables' and documentation to describe 'legal' configurations for all the possible spatial combinations of standard and non-standard devices.

These and other aspects of the invention will become apparent from the detailed description set forth below.

BRIEF DESCRIPTION OF THE DRAWINGS

FIG. 5 presents tables for illustrating a first example of an implementation according to an exemplary embodiment of the invention.

DETAILED DESCRIPTION OF THE PREFERRED EMBODIMENT(S)

Figure 1A:
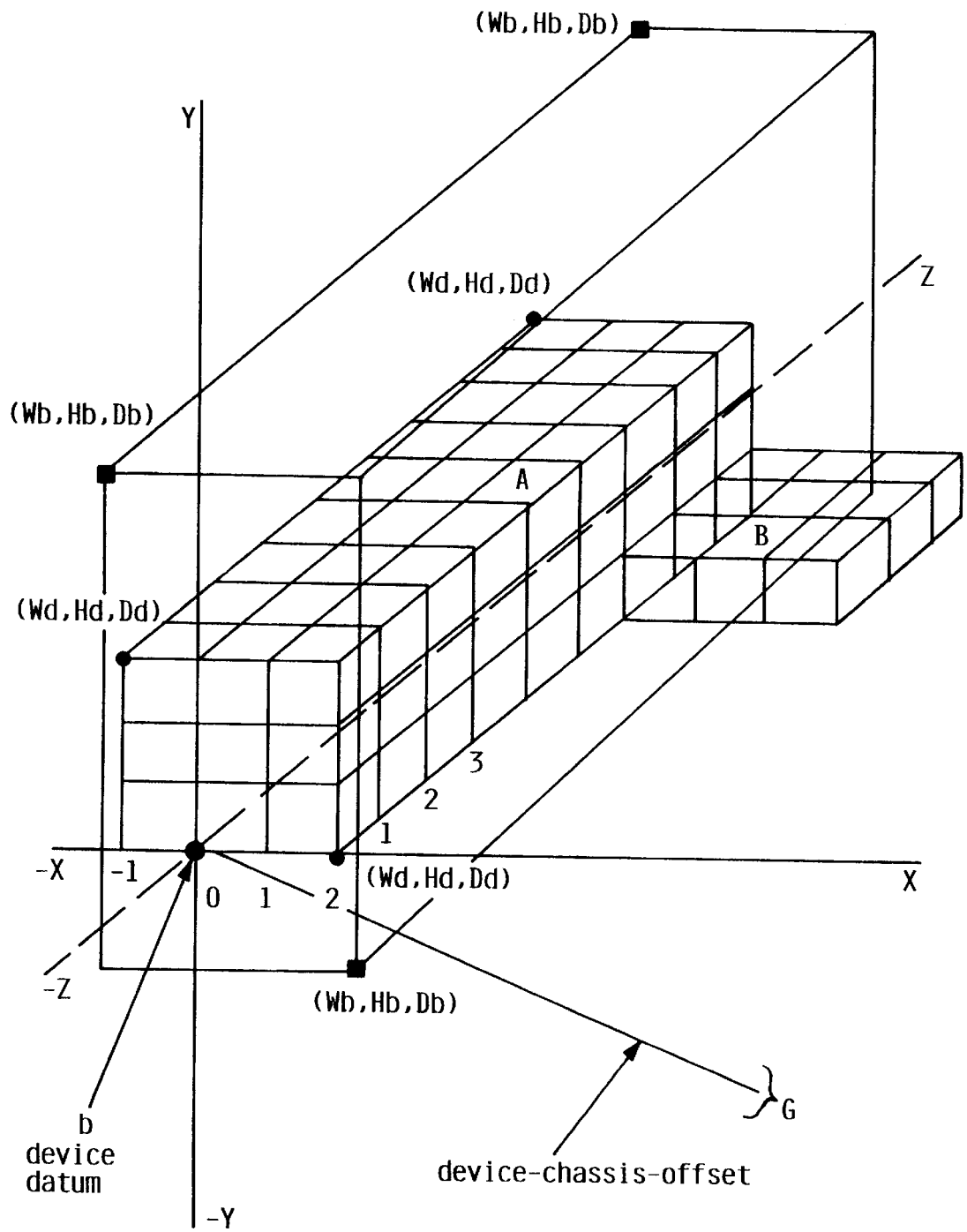
FIG. 1 illustrates a virtual envelope and virtual solid in a system for explaining a point method according to an exemplary embodiment of the present invention.

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

Considering the problems and needs presented above in the background information section, it has been determined that the system maintenance (SM) code basically has two options for obtaining Volumetric-VPD for a component and bay. One method is to 'hard-code' all the information in tables within the respective SM code. The idea would be that for each unique device-order/part-number, collectively referred to herein as 'CCIN' (Component Code Identification Number), the SM code would create a table look-up to that component and bay volumetric data. This way, that component's CCIN could be typed into the system, either locally or remotely, prior to ordering/plugging a component, and the SM code could determine if adjacent slots are interfered with, or may become 'covered' and unusable, as a result. This would be the preferred method for most 'non-chassis' type devices, e.g., certain PCI Cards and perhaps DASD components, especially since manufacturers tend to be most prone to create non-standard devices with high volume device classes such as these.

The other option is to divide some of the volumetric data between the respective SM code and the hardware. For example, one 'split' could occur by devices and bays. However, presently, no device manufacturers store volumetric data in their device VPD. Also, since many devices are stocked and ordered with hardware 'sleeves' attached, it would make sense to hard-code those devices' volumetric-VPD in the SM code if the sleeve 'significantly' affects the dimensions of the device. Clearly, it may be undesirable to have to change a device-part-number only for the purpose of reflecting what type of 'sleeve' it was packaged in. (Note however, that different CCIN numbers differentiate one model DASD tray from another model DASD tray).

Some 'high-volume', 'low-margin/function' devices (e.g., PCMCIA cards) are 'highly' standardized and are not likely to be 'customized' with additional packaging or redesigned for marketable advantage. For this class of device, it would be preferable that the device store its volumetric VPD (with respect to a device-datum) either in the device itself, or in the device-driver software layer immediately 'above' it.

For chassis-class-devices (I/O backplanes, Power Supplies, Blowers, etc.), it makes more sense to store all the bay volumetric VPD, and some device volumetric VPD, in a 'chassis node', i.e., in the hardware. This is discussed in more detail below.

In either case, the provision of Volumetric VPD allows the SM code to either 'read-out' or 'hard-code' this information, create a 'virtual-solid' of the components, and compare them with a 'virtual-envelope' (of the bay) in which to place the component. The SM code can then determine whether a particular component will fit a particular bay, and what restrictions that component might place on adjacent slots.

Figure 1B:
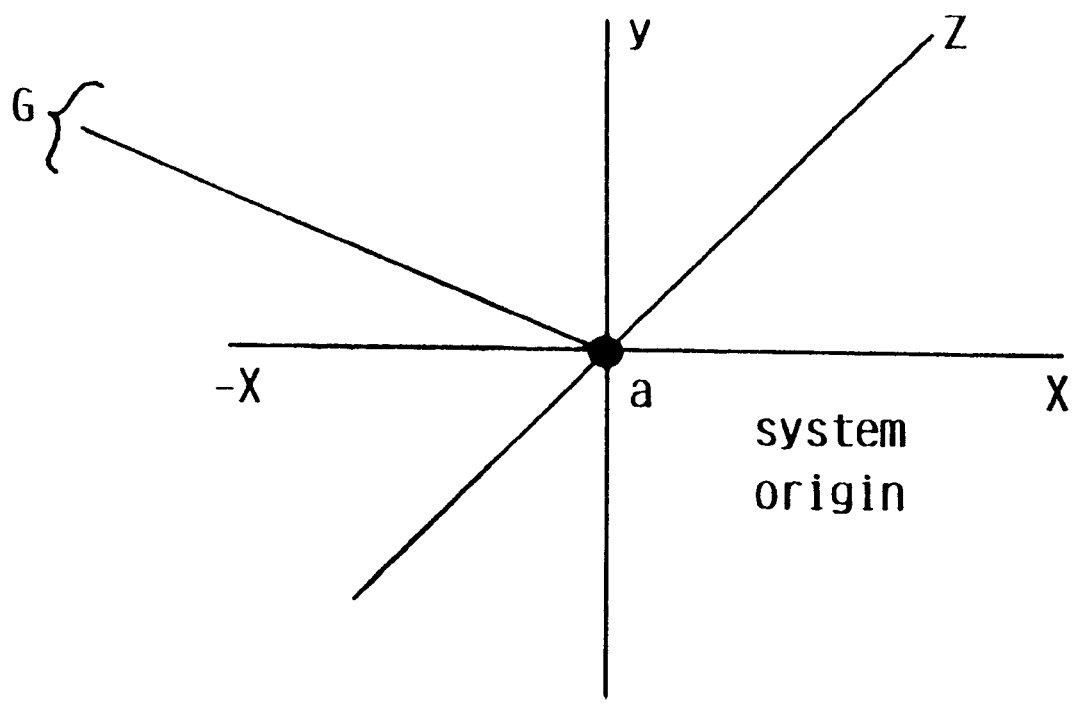

The picture in FIG. 1 depicts an example of a 'virtual-envelope' and a 'virtual-solid' (A-B). These structures are built in 'Lego™-block' fashion around a given fixed reference point. For the purposes of this disclosure, this reference point will be referred to as a 'device-datum' and it is assumed this datum can be determined from a device manufacturer's data-sheet. An axis and device-datum is defined, and the number of 'cubics' (cubes/units) along each axis defines the solid (or the envelope).

At a minimum, an initial device datum 'b' and a chassis system-origin ('a') should be defined but there may be multiple additional reference points chosen within a computer frame. Depending on how many bytes are allocated to store the structure, or how much resolution is desired, it may be advantageous and/or necessary to define multiple reference points throughout a computer chassis.

An interactive modeling tool, such as CATIA (Computer Aided Three-dimensional Interactive Application) from Dassault Systemes, could be used to define a single 'system-origin', or multiple 'sub-chassis-origin' definitions which would help dimension a particular device bay.

Choice of the coordinate storage length is an issue which has some effect on the operation and capabilities of the arrangement, and should, therefore, be addressed. For example, choosing one byte per coordinate permits representing 256 one-hundredth inch (0.1") cubes along each axis, or 256 one-millimeter (1 mm) cubes, along those axes. However, choosing 2 bytes per coordinate, on the other hand, allows much larger vectors and, therefore, might be preferable since less datums would then be necessary to completely define all structures (it also allows extra bits for a concept called 'encoded-dimensions' which will be described later herein).

In terms of defining angles, assuming a one-degree resolution, and one-bit combination per degree, one byte would limit angle definitions to 256 degrees, and therefore, two bytes would be preferable. Of course, since every angle between 0 and 359 degrees may not be needed, data optimization techniques could be used, such as simply using two bits to define which 'quadrant' (0–90, 90–180, 180–270 and 270–360 degrees) an angle falls into, and the remaining bits to define the degrees. Three bits could define sub-quadrants dividing the angles into eight ranges (0–45, 45–90, etc.), and so on. For the purposes of this disclosure, it is assumed that data standardization will be worked out through market competition, industry committees, and the like, and therefore, such details are contemplated to be within the spirit and scope of the invention defined herein.

One exemplary embodiment of the invention may be implemented and applied to a computer system, as is illustrated in FIG. 1. In FIG. 1 an 'L' shaped solid (A__B) within a computer chassis and 'plugged' inside a device-bay envelope is represented. FIG. 1 illustrates what will be referred to herein as the 'Point-Method' implementation or embodiment of the invention for configuring the volumetric information, for the sake of explanation and differentiation from other implementations or embodiments which will be described below. It should be noted that in this example, the __B leg of the solid has an extent which is partially 'outside' its allocated bay volume, and therefore could either potentially create a mechanical interference, or perhaps 'intrude' on an adjacent slot.

The three Width, Height, Depth coordinates (i.e., the 3 Points) defining the rectangular device volume, and the three W, H, D coordinates (3 Points) defining the rectangular bay volume, preferably would be determined and specified by the system-chassis manufacturer. However, the device manufacturer could supply the device coordinates. Either way, the invention is not intended to be limited by who provides the particular coordinates.

Both the device and bay volumes are defined with respect to the device-datum "b" and the device-chassis-datum "a" which share the same coordinate geometry X, Y, Z, including rotational geometry (roll, pitch and yaw) about each axis.

The rotational direction is defined as 'positive' in the clockwise direction about each axis (conceptually 'drilling' into the device-datum). The device-datum "b" is set to (0,0,0) and all six W, H. D coordinates are defined from that origin. The device-chassis-offset is the distance from some pre-defined system chassis origin "a" to the device-datum "b". If the solid (or envelope) is complex, like part A-B in FIG. 1, then an additional three coordinates should preferably be defined with respect to both the chassis origin "a" and the device-datum "b". These additional coordinates are not shown in FIG. 1 for simplicity of illustration.

Figure 2A:
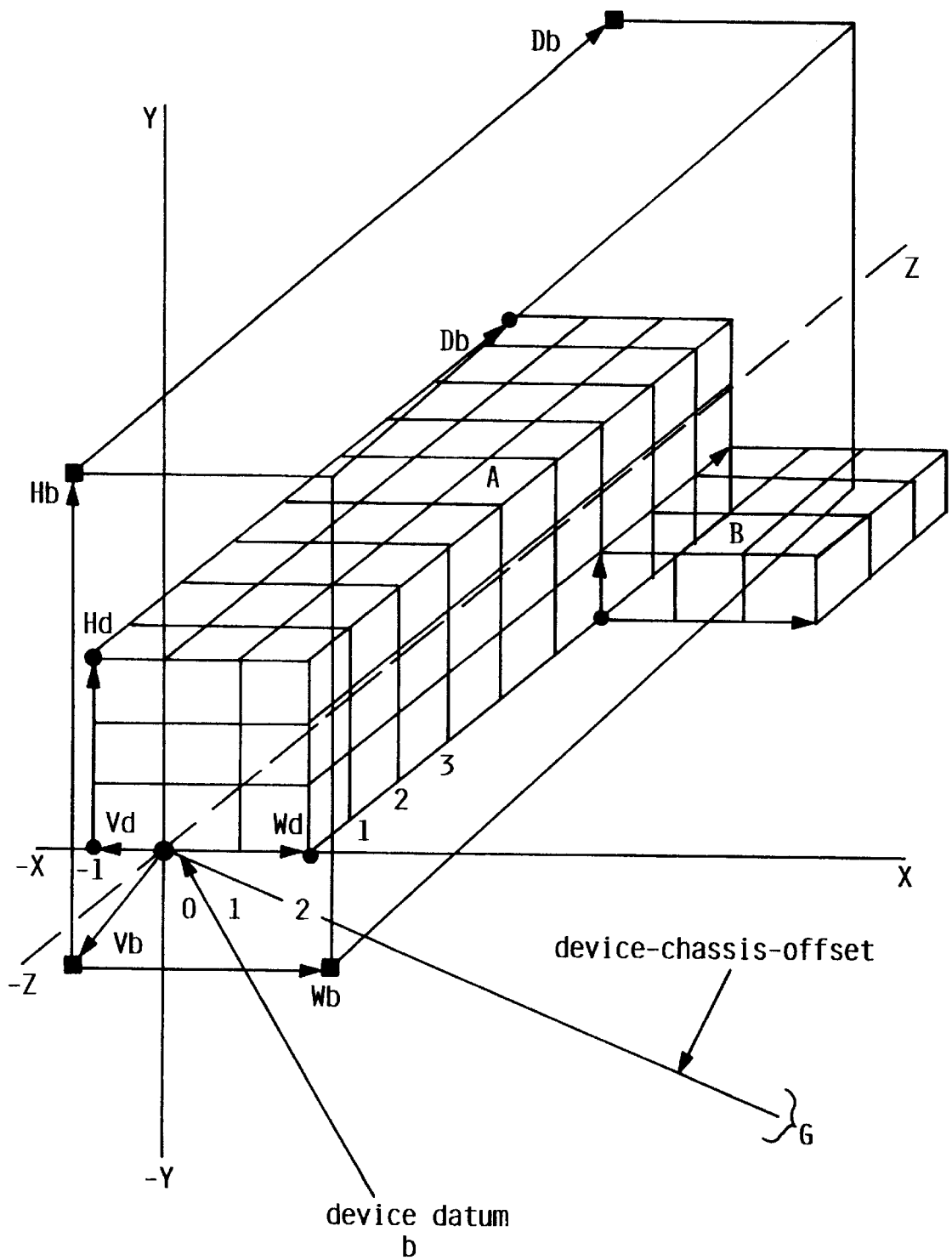
FIG. 2 illustrates a virtual envelope and virtual solid in a system for explaining a vector method according to an exemplary embodiment of the invention.
Figure 2B:
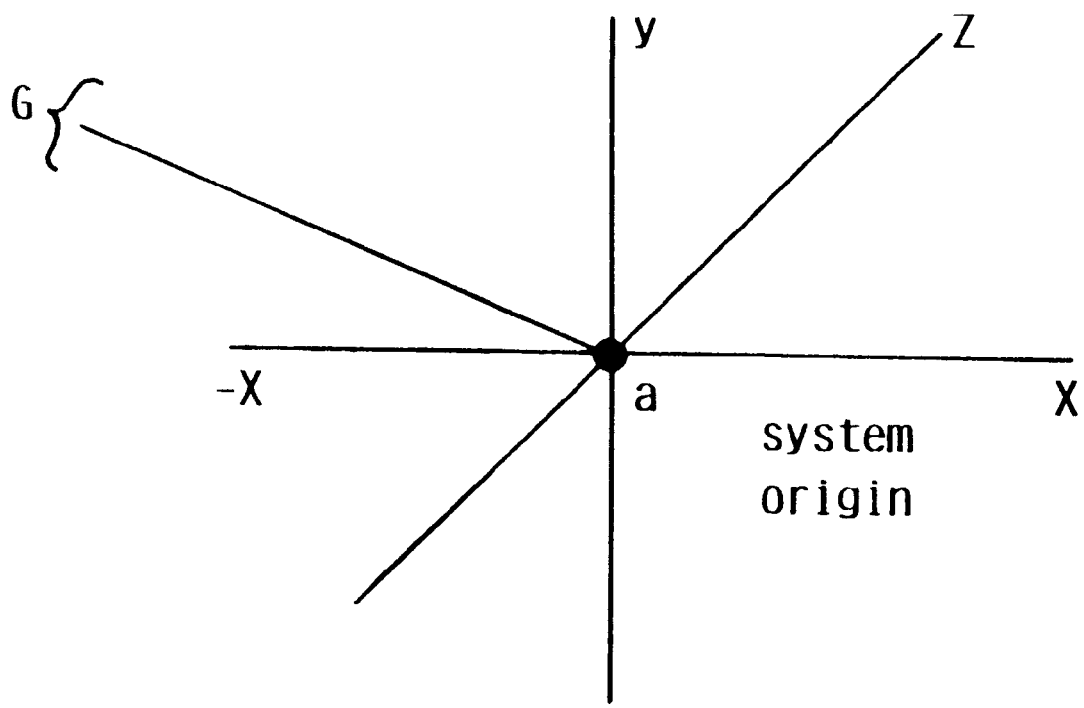

An alternative method to describe the 'virtual-solids' and 'virtual-envelopes' will now be described and referred to herein as the 'Vector-Method'. This is illustrated in FIG. 2.

In this method, an offset-vector for the device position Vd, and the Width, Height, and Depth 'length' parameters (Wd, Hd, Dd) of the device, along with the offset-vector for the device-bay position Vb and its lengths (Wb, Hb, Db), are described with respect to the device-datum "b". It is noted that the part_B solid vectors aren't shown, for the sake of simplicity.

This Vector-Method may advantageously be a more 'storage-optimum' (in bytes) implementation than the previously described Point-Method, since instead of 18 bytes (actually under certain circumstances, only 12 bytes, due to redundant data, as is explained later below) to represent a single volume with respect to a datum, only 12 bytes are required (6 for the point, and 6 for the vector).

Both of these first two methods still require the device-chassis-offset, and a convention for device classes, so that the axis of the device and chassis agree. Both methods require the rotational parameters (roll, pitch and yaw) as well.

Regarding this second Vector-Method which uses lengths, if device manufacturers adopt and store 'Volumetric-V P D' in their devices, it should be relatively straight forward for them to store 'length' parameters, since currently they almost always detail mechanical drawings with length parameters.

The System Management (SM) job is roughly equal in either of these first two methods. For a single volume, the SM either have to determine and 'spec' 2 vectors+3 'lengths', or they have to determine and 'spec' 3 points with respect to the device datum. However, from the standpoint of documentation and clarity, it may be advantageous and convenient to use the Point-Method.

It should also be noted that other volumetric data specifications could be implemented within the spirit of the invention. For example, it may be that a large number of devices, and the bays they are intended for, are of a standard type, that is, conform to standardized dimensional limitations. In such a case, the particular standard which the device and/or bay conforms to could be represented by one or two bytes, and the system would determine, from a look-up table, for example, the actual dimensions which correspond to this standard.

As another example, it may be that most devices and bays are generally rectangular, or some other regular geometrical shape. Under such circumstances, a single byte could be used to indicate the regular geometrical shape, e.g., rectangular, trapezoidal, etc., or that the shape is not regular. Assuming a regular shape, such as a rectangle, the remaining dimensions could be specified with a minimal amount of data. In particular, for a rectangular device, e.g., a slot card device, and a rectangular bay volume, e.g., a slot connector volume, a single 'length' and an angle can be used to define the length and height of the respective device or bay. This is because a rectangle can be defined as two right triangles, each triangle having its hypotenuse extending from one corner of the rectangle to an opposite corner at a particular angle. Based on trigonometric relationships, with the angle and the hypotenuse known, the base and height of the triangles, and therefore, the rectangle, can be determined. So, for a 'rectangular' device or bay, only the hypotenuse length and one angle needs to be stored to fully define the height and length. Another byte could be used to define the thickness of the three-dimensional device or bay volume. Alternatively, the length of an hypotenuse drawn from one corner of a three-dimensional 'box' (representing the device or bay volume) to the opposite corner of the 'box' along with two angles, one in the plane of the height-width and one in the plane of the thickness, can define the height, width and thickness of the three-dimensional volume. Of course, for complete positioning, bytes for a device-chassis offset would also be required.

A third method to define a virtual-solid and/or virtual-envelope is using the method illustrated in FIG. 3, which will now be described. This method will be called the 'Displacement-Method' herein. In this method, the device-origin (datum) is used. However, this time, positive and negative displacements along each axis are determined.

Figure 3A:
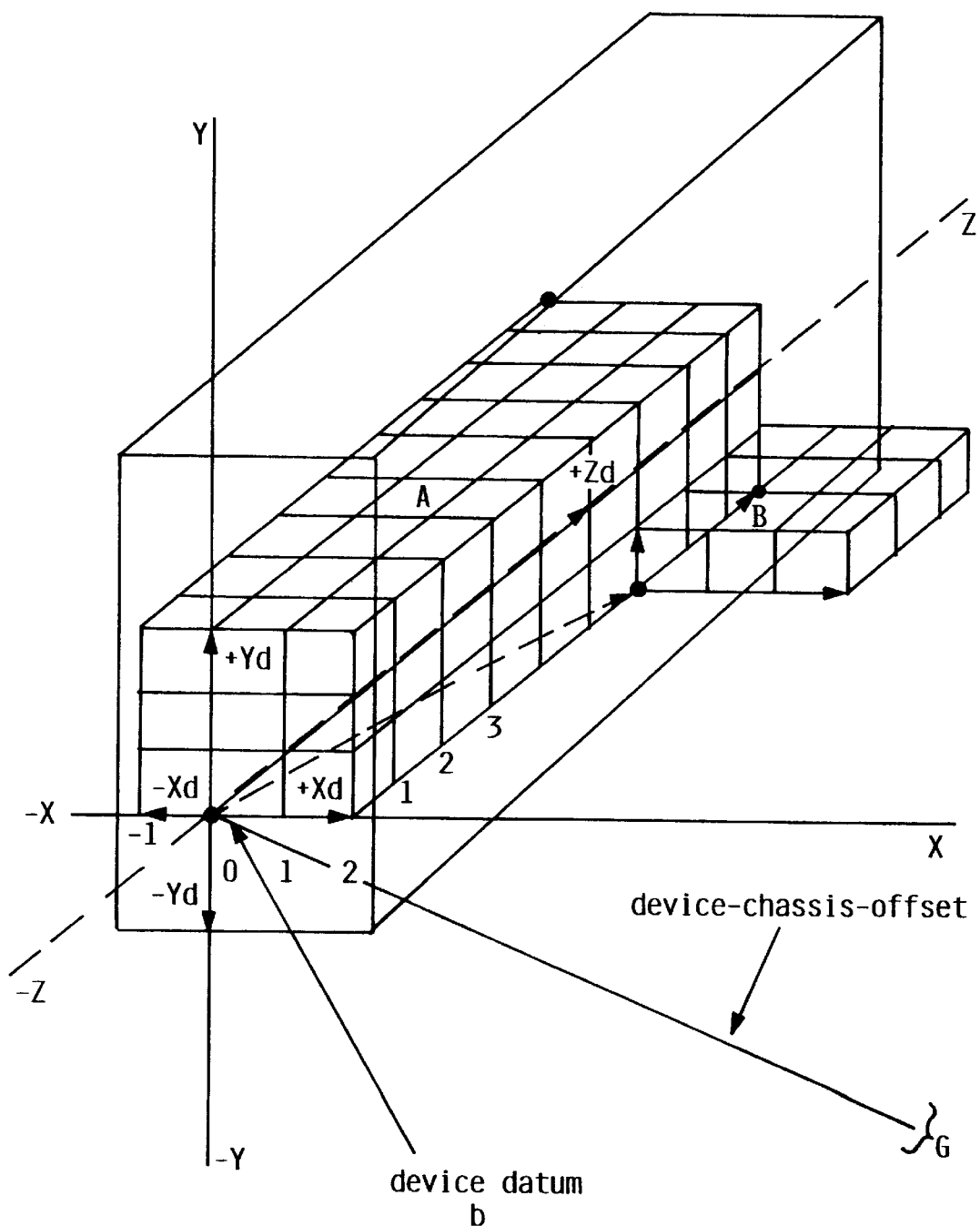
FIG. 3 illustrates a virtual envelope and virtual solid in a system for explaining a displacement method according to an exemplary embodiment of the invention.
Figure 3B:
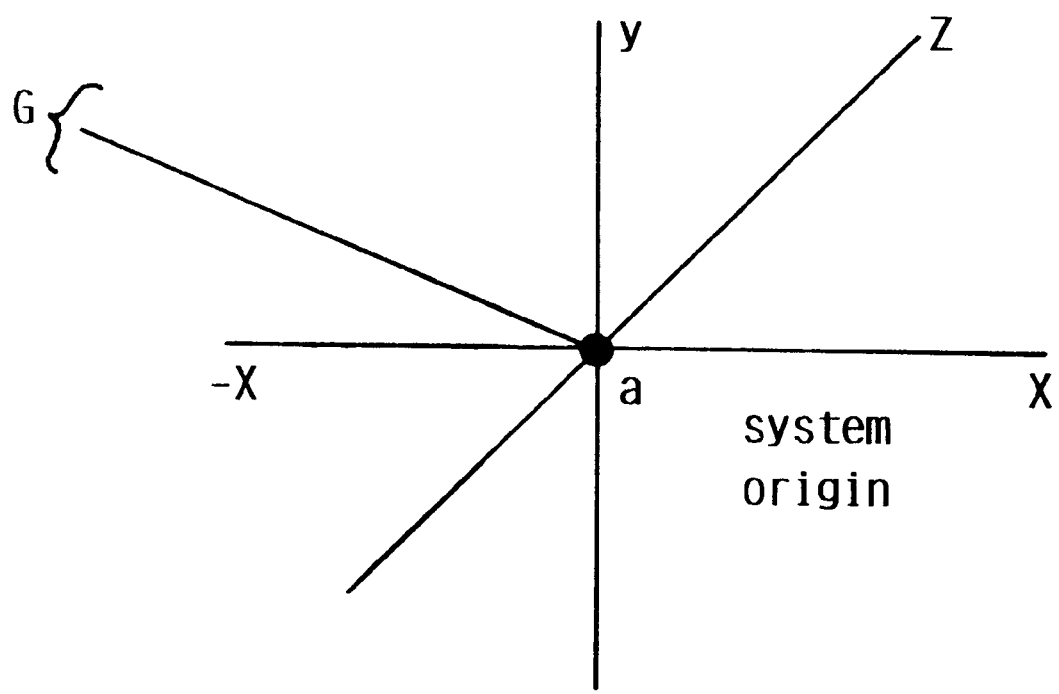

For clarity, only the device displacements are shown in FIG. 3, i.e., −Xd, +Xd, +Yd, −Yd, +Zd, and −Zd (although in this case, −Zd=0), but similar displacements would be used in this method for the virtual-envelope. It should be noted that the _B portion of the solid still requires a vector to describe a secondary datum before the displacement coordinates can be defined for this 'attached' volume.

Any of the above-described methods can be used for providing volumetric data according to the invention. Alternatively, according to the invention, any combination of these methods could also be employed. For instance, the virtual-solids could all employ the Offset-Method and all virtual-envelopes could use the Point-Method. Or, a virtual-solid could use the Offset-Method for the 'original-solid', A, and employ the Point-Method for the _B portion of the solid, and so on, all of which would be considered within the spirit and scope of the invention.

Cooperation between the VPD that exists in the device and the computer chassis is one aspect of this invention. The resolution for both the device (virtual-solid) and the device bay (virtual-envelope) coordinates should be understood by the system, and preferably should use the same metric. That is, if tens-of-inches (cubed) are used for devices, then that should preferably also be used for the device-bay coordinates. Standard design tools, and current state of the art computer chassis, would suggest that 1 mm should be used as an appropriate 'standard' metric. Of course, as long as there is an indication of what standard is used for a device, for example, then a conversion to a different standard used by a system could be accomplished, e.g., from millimeters to inches or vice versa.

Ultimately, the number of datums and the resolution correlates to the ability to determine how much 'free-space' is defined between the solid and its envelope, and from one envelope to another. Also, appropriate tolerances should be factored into whatever resolution is chosen to ensure an ample clearance between the solid and the envelope.

Of course, if multiple chassis-datums are chosen, all should have a fixed spatial relationship to each other, such that multiple and varied sub-chassis components, and device bays, can coexist in a single chassis.

Figure 4A:
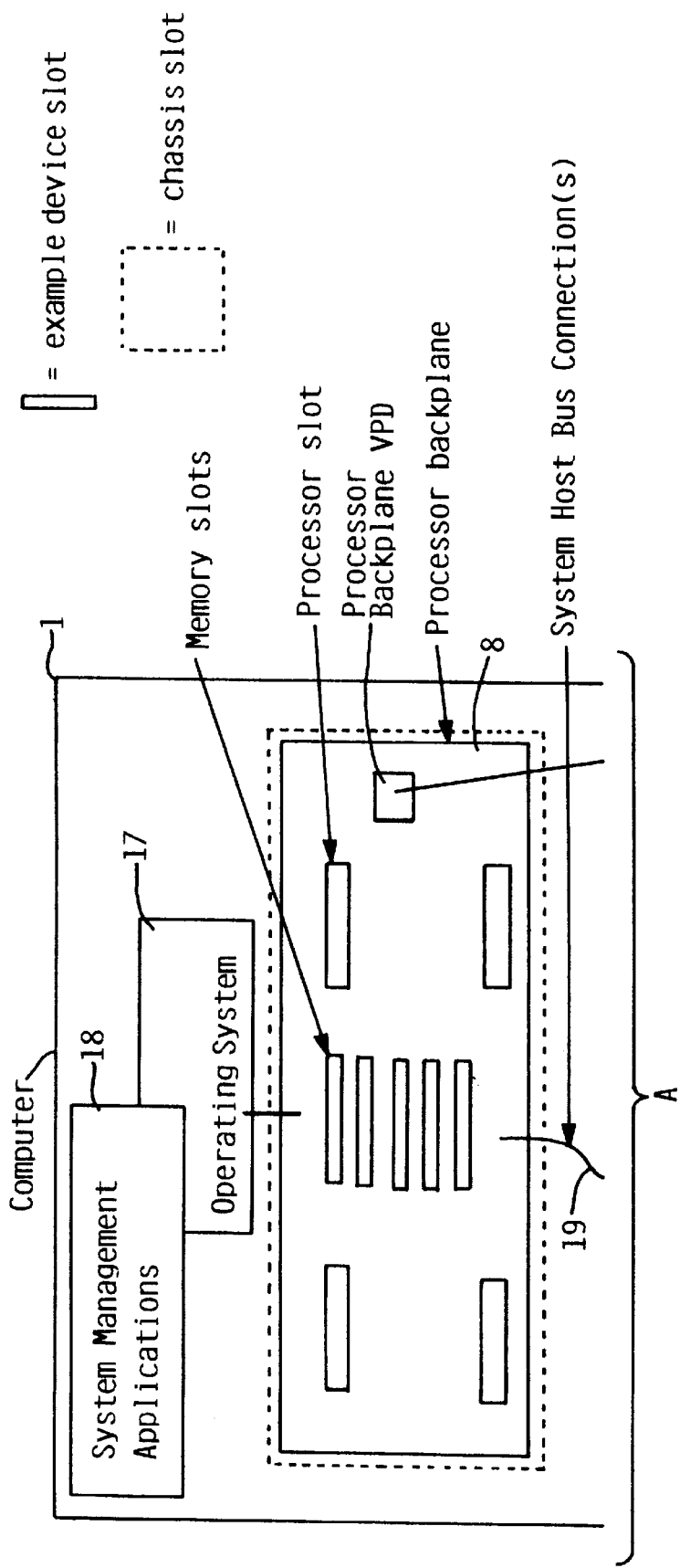
FIG. 4 illustrates a computer system in which an exemplary embodiment of the invention is implemented.
Figure 4B:
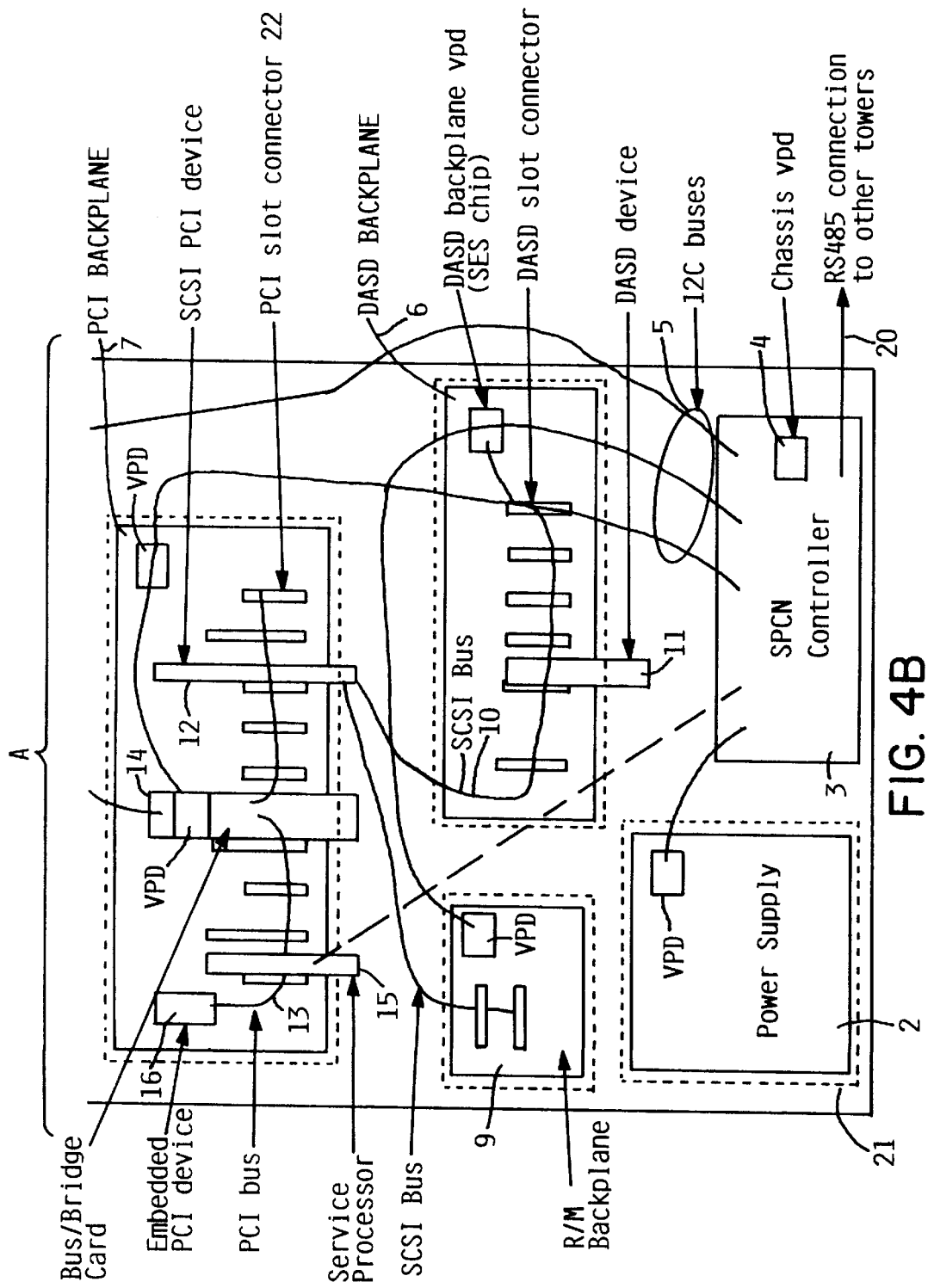

The storage of most component 'virtual-envelope' parameters is accomplished in an SES (System Enclosure Services) node, such as provided in the IBM AS/400 'SPCN' (System Power Control Network) node seen in FIG. 4, for example ("IBM" and "AS/400" are trademarks of International Business Machines Corporation, all rights reserved), or the proposed INTEL chassis node described in their IPMI (Intelligent Platform Management Interface).

FIG. 4 illustrates an exemplary computer system in which an embodiment of the invention is practiced. The computer system components each have a VPD chip, e.g., DASD backplane 6 has a VPD chip. Further, according to the invention, a PCI card, for example, would be provided with the above described volumetric parametrics in the VPD memory thereof. The figure also illustrates other components of the system for utilizing, and modifying when necessary, the VPD for System Management purposes.

In more detail, FIG. 4 shows a computer enclosure/system 1 having a power supply 2, an SPCN controller 3 with chassis VPD chip 4, and a number of other devices having VPD chips interconnected by an I2C bus system 5. In particular, there is shown a DASD backplane 6, a PCI backplane 7, a processor backplane 8, and an R/M (Removable Media) backplane 9. The DASD backplane 6 has an SCSI bus 10 interconnecting DASD slots connectors, one of which has a DASD device 11 therein. The DASD backplane VPD memory is provided by an SES chip.

The SCSI bus 10 is interfaced to the PCI backplane 7 by an SCSI PCI adapter device 12. A PCI bus 13 interconnects a number of PCI slot connectors on this backplane 7. A bus/bridge card 14 interconnects the backplane PCI bus 13 with the system host (processor) bus 19 on the processor backplane 8. Also on the PCI backplane 7 is a service processor card 15 used to initialize the CEC (Central Electronics Card) components (processor/memory).

The PCI backplane 7 has an embedded PCI device 16, such as the Ethernet controller in example 7 above. The SCSI bus 10 also connects to the R/M backplane slots.

The processor backplane 8 has the host bus, memory slots, one or more processor slots, etc., and implements the Operating System and System Management Applications shown in block diagram form as blocks 17 and 18. Hard-coded chassis, backplane, and/or device parametrics may be stored in the operating system 17 for comparison with parametric data from and external source, such as a web site (not shown), or VPD parametric data stored in a plugged electrical device.

As is evident from the figure, each backplane 6, 7, 8 and 9, is provided with its respective VPD storage chip. The power supply 2, a so-called chassis device, is also provided with a VPD storage chip. Although not shown, advantageously, other electrical; devices (e.g., cooling fans, and peripherals) would have VPD memory the contents of which could be up-loaded to the operating system for access when needed by the system.

The SPCN controller 3 interfaces with all of the VPD chips, and has thereon the chassis VPD chip 4 having chassis specific memory for storing chassis slot vital product data accessible by the computer operating system. The chassis specific memory could alternatively be provided at the computer system operator panel (not shown) or at the service processor 15, or another location associated with the chassis 1, as would be apparent to one skilled in the art. Through a bus 20, e.g., an RS485 serial bus, other SPCN nodes in other computer enclosures are interconnected.

Chassis slots, e.g., power supply slot 21 with power supply 2 therein, are shown in dotted/dashed lines, while backplane device slots, e.g., PCI slot connector 22, are shown in solid lines. The illustrated backplane slot spacing (not to scale) represents the pitch between connectors for devices, such as direct access storage devices (DASD's) and PCI card devices.

Certain device chassis components, for example, PCI backplanes, DASD backplanes, power supplies, regulators, and blowers, are likely to have a low-level (I2C) interface between the SES node and those components. Preferably, early in the initial program load (IPL) and prior to any system buses (like the PCI bus) being initialized, the SES node in these systems can provide the SM code with a dimensional mapping of all device bays, and, for chassis-devices using the SES I2C connection, can read and supply device-volumetric; data read from the device itself.

For a more complete view of the physical layout of the computer, any pluggable chassis device without a CCIN and/or I2C connection could have its volumetric device and bay VPD 'hard-coded' in the SES node, and that, too, can be sent to the SM code.

One advantageous reason to store the 'virtual-envelope' and certain 'virtual-solid' parameters in the SES node is to reduce the need for additional documentation that would be required to 'specify' these dimensions to application-level code, like SM code. It is also a trade-off that implies the 'chassis' components and bays are infrequently ordered and when featurable, rarely increase the volume originally allotted within the chassis frame.

Also, since the SES node has processing capability and usually runs off of a 'trickle-charge' circuit or a battery, the node can also perform some preliminary checks for any interference and/or clearance prior to the system power up and system (SM) IPL.

Another alternative, according to the invention, for storage of the 'virtual-envelope' parameters for certain chassis-slots (bays) and device-slots (bays) could be the backplane (CEC, DASD, 10) EEPROM (VPD) chips. These VPD chips are typically connected via the I2C interface to both the SES nodes and the system buses. The operating system (OS) can access these parameters through either the separate SES-to-OS interface or, later in the IPL, through the system bus interfaces.

However, there may be a possible drawback of storing virtual-envelope parametrics for backplane-pluggable devices on the backplane EEPROM. The drawback would be that the backplane part number may need to change based on configuration. If the SES node does not have the ability, or there is no desire to re-write the EEPROM at IPL-time (or during a concurrent add, for example) based on the system configuration, then that backplane, when plugged in a system chassis that creates unique device slot interference, or clearance, would need a new part number to account for the new/different 'virtual-envelope' parameters stored there.

It would, therefore, be advantageous to keep most, if not all, volumetric device-bay VPD in the SES node, but retain the flexibility to read/write all chassis EEPROM devices for the purposes of exceptions and for flexibility.

Reference to the related applications referred to earlier can be made for ways in which various other chassis and slot parameters can be stored. See for example co-pending applications: No. 08/971,687 (RO997-154-IBM-108) regarding interfaces/slot-map, No. 09/265,394 (RO998-233-IBM-126) for slot/bay parametrics, and No. 09/262,023 (RO998-232-IBM-232) for slot/bay label assignment.

The additional 'virtual-envelope' parameters would preferably be stored primarily in the SES (SPCN node) chassis-VPD and secondarily in the various backplane slot-map VPD. The 'virtual-solid' (i.e., device-component) parametric VPD would preferably be appended to the existing component VPD for those components. Exemplary details of this component VPD have already been described in the co-pending patent applications, mentioned above, but these details are not necessary for a complete understanding of the present invention.

Naturally, the number of bytes used for both virtual-envelope and virtual-solid definitions depends on the complexity of the shape being described, the resolution required, and the number of reference datums specified.

It may be that most typical devices and components in most target systems can be adequately and conveniently defined by rectangular, or other regular solid, volumetric parameters. However, there may be situations where more complex data is required. Under certain circumstances, where volumetric data for a device is not readily available, the device could be scanned using laser or other means and a three dimensional data set complied.

There could also be some exceptional cases where, because a device is extremely thin, for example, essentially only two dimensional data is all that is required to adequately model the volume the device occupies, i.e., one dimension is essentially "0". This would naturally depend on the scale of the metrics used, i.e., the unit of measure, for example, 1 mm or 0.01 mm.

It could also be that a device has a volume that is dynamic, i.e., changes, such as might be the case with a moving or movable part, such as a sliding drawer or tray, or the like. In that case, the stored data could represent the maximum extent of the space required for the device in operation or during removal/insertion, to avoid possible detrimental contact with other system components, or an indication that a component in an adjacent or nearby slot, for example, should be moved to provide the needed clearance to install/uninstall the device. Whatever the reason, a bit could be provided and used to indicate that this type of characteristic, termed a "soft dimension" herein, is present, e.g., that the device is disposed on a sliding drawer or hinge. Thermal expansion, or other factors affecting volume, might need to be taken into account, especially where extremely tight tolerances are required.

Generally speaking, two datums can locate a device, and two volumes can describe it. Referring to the Point-Method, a 'system-origin' on the chassis and a device-datum are determined, as well as the volume of the device (double-bytes for coordinates Wd, Hd, Dd) and the bay (double-bytes coordinates for Wb, Hb, Db). If the bay is rotated in any direction with respect to the system-origin axis, that too should be specified, and all parameters should preferably be described in a System Product Specification.

Note that one reason double-bytes are preferred is because units of 1 mm only allow 10" in one byte and only 256 degrees (for rotation) can fit in one byte. However, it is recognized that some form of compaction of the bits could be used where a full 2 bytes are not needed. One possible implementation of compaction into a 32-bit string could be as follows (for 'positive' numbers only, since no 'sign' bit is included):

Use word (32 bit) fields
Each x, y, z field is 9 bits (values of 0 to 511)
There is a 4 bit Scale field (0.1 mm, 0.5 mm, 1.0 mm, etc.) to define the size of values in x, y, z fields
There is a 1 bit "extension field"
    if=0 then last of origin or shape
    if=1 then there is another set of origin or shape parameters (used by complex shapes).

The device-chassis-offset vector is also needed, and it is represented by 3 double-byte lengths (Xc, Yc, Zc). Rotations of the device-bay with respect to the system-origin axis are called device-bay-pitch (rotation about the x-axis), device-bay-roll (rotation about the y-axis), and device-bay-yaw (rotation about the z-axis), and these are included as necessary. These vectors are represented in degrees, in 3 double-bytes (Pb, Rb, Yb).

Note that a local-backplane-datum has not been used to define a device-bay. This intermediate datum and offset vector could be used to split the volumetric VPD storage (bytes) between the SES node and the backplane EEPROM. It is not used here in the example because the backplane EEPROM is usually space limited and potentially creates a more costly design to accommodate. It is probably cheaper to store all the bytes in one chip (SES node) than separate the storage into multiple chips. Also, as alluded to earlier, if the device coordinates change due to any engineering changes to a 'sleeve' or modification of the subsystem chassis above the backplane, for example, neither the backplane part number nor the backplane VPD (or both) needs to be rewritten. Creating and maintaining a unique backplane part number due to volumetric VPD would not generally be advantageous or preferred, although it is a modification which could be accomplished within the spirit and scope of the invention.

Another option to storing individual device-bay-volumes (Wb, Hb, Db) in the SES node is to store a volume (potentially simple or complex) for the entire available space above the backplane in the backplane EEPROM, and have the SM code 'place' each device-volume inside this space. The SES node might then avoid having to store each bay's volume and rotation, for instance. The rotation 'may' be avoided, since it might inherit the rotation of the backplane. This is not guaranteed, however, since an 'interposer' between the device and the backplane could still create a rotation on a slot basis. Storing each bay's volume might be avoided, since it would be the SM's responsibility to take each device-volume and 'place' it within the given volume on/above the backplane. However, ultimately it may be difficult to get away from describing the packaging volumes at the slot level.

Even a 'single-volume' sent up for the entire backplane should contain, or at least reserve, the SES space (bytes) for possible chassis interference on a slot level. Also, although all but one (the chassis-datum to backplane-datum) of the individual device-chassis-offset vectors will be eliminated, that is gained back by storing the same number of vectors from the backplane-datum to each slot-datum. So, whether this would actually provide any advantage over storage in the SES node will depend on the complexity and specifics of a particular implementation.

Another advantageous reason for maintaining the ability to store the 'virtual-envelope' at the device slot level is to allow for the concept of 'soft-dimensions'. PCI Cards, for instance, utilize a 'removable-barrier' called a 'card-guide' or 'insulator' in between each card slot. This card-guide can be removed in the factory or in the field to allow a 'non-standard' (wider) PCI card to be plugged. In this case, either the SES node could 'sense' the absence of the 'barrier' and rebuild that volumetric-VPD, or the SES node parameters could remain static and allow the SM code to pre-classify that dimension as a 'soft' one, and choose to ignore that dimensional 'interference' if one was about to be plugged.

One preferred method of implementing soft-dimensions would be to encode this information in the 'virtual-envelope' parameters, i.e., 'encoded-dimensions' referred to earlier. For instance, if 2 bytes are used for each coordinate and millimeters are used as the metric, there is additional space inside this dimensional parametric to 'encode' certain information.

An example is as follows:
Use 32 bit fields for each dimension:
    bits 0–>11=>13+feet/dimension
    bits 12, 13=barrier-type:
    00=no barrier, this dimension the allocated dimension for that slot, extending beyond it might create interference with a adjacent device only;
    01='sensed-removable-barrier', SES can sense the presence of this removable barrier and can change it to 'no-barrier' if presence is not found;

10='non-sensed-removable-barrier', SES cannot detect this but the SM code can use to initiate instructional code on how to remove it, if necessary (e.g., hinge or drawer situation);

11=reserved bit 14=reserved bit 15=sign-bit

Most of the description above assumes a simple rectangular volume. For example, in the Point-Method of FIG. 1, if just the 'A' portion of the A_B solid above is considered a complete device, then only 18 bytes could be stored to represent its volume, and 18 bytes could be stored in the SES node VPD chip memory to describe the 'A' device bay volume within the computer. Note, however that for each solid or envelope described, there is probably some redundant information.

For instance, in the A—solid above, note that the 2 x-coordinates, 2 y-coordinates, and 2 z-coordinates have been repeated. Therefore, the total bytes required to describe a single volume is actually only 12 bytes, as was alluded to earlier herein.

To describe the location of both the A—B solid and its device-bay, only 6 bytes are required (2 double-bytes for each coordinate of Xc, Yc, Zc).

Therefore, if just a simple A—solid is considered, then 28 bytes would be required for the 2 volumes, and 6 bytes to locate the device-datum=34 bytes. If for instance, the device/device-bay was a power-supply with an I2C connection to the SES node, then perhaps, for example, all 34 bytes would be stored in the SES node.

If the device was a PCMCIA device, then perhaps, for example, 14 bytes for device volume would be stored in the device, and 20 bytes would be 'hard-coded' in the SES node storage.

If the device was a DASD with 'sleeve' hardware, then perhaps, for example, 14 device-volume bytes would be 'hard-coded' in SM code and 20 bytes stored in the SES node storage.

If the device was a PCI Card, then, for example, 14 bytes for the device volume could be stored in SM code and 20 bytes stored in the SES node.

If the device was an I/O Backplane connected to the SES node with an I2C connection, then perhaps, for example, all 34 bytes would be stored in the SES node. All 34 bytes could be stored in the SM code in all situations, but because of the reasons stated above, a more appropriate tradeoff would be to split the Volumetric-VPD parameters between the Operating System (SM) software and the hardware SES memory.

Once the datums and physical models are defined, the SM software has all the information it needs to accurately determine the spatial relationships between all computer components. Note that not all components necessarily need to be defined, depending on the application. For general OEM manufacturing situations, for example, only components that can be ordered and are 'pluggable' need to be represented.

Note that it is not necessary to fully implement the above-described architecture to take advantage of various parts of it. For instance, a standard subsystem (like a PCI card cage) could do the following:

1) chose not specify a 'system-origin' or any local datum;
2) chose to implement only the 'virtual-solid' volume parameters (in a featurable device VPD or hard-coded in SM code); and
3) specify only a virtual-width (X coordinate) in a backplane EEPROM.

The SM code would then only be capable of detecting interference along the X axis. However, since there is no base datum, there also is no means to determine which direction a non-standard 'PCI' device may overlap an adjacent slot. In this case a convention should be developed and understood by the packaging design engineers and the SM software developers.

The following two examples will describe conventions to solve this problem. However, note that the solution involves writing a backplane EEPROM with different information depending on the orientation of the backplane in the system, which has consequences.

This technique inherently implies that two identical backplanes should be given different part numbers (which is generally a no-no) and ONLY because a few bytes were changed in the EEPROM. This technique should preferably only be used when a particular backplane is anticipated to only be used in one orientation, or when the SES node has the capability (and it is desired) to re-write the EEPROM immediately after power-up (during IPL or a concurrent maintenance action) based on system configuration. Again, note this approach only solves 'volumetric-VPD' issues and interference along one coordinate axis, and so is in this sense, a 'partial' implementation.

To illustrate the first example, refer to the tables presented in FIG. 5. Consider either a PCI Card slot or a DASD bay in a computer system. Once a computer system has been developed, the device plugging orientation and the Label designations for each slot are fixed. The directionality of expected interference can then be determined using a convention for storing the slot Labels in the EEPROM. The convention being illustrated below would be to understand that increasing EEPROM addresses points to the direction a device might 'overhang' a neighboring slot.

For instance, pick any slot (C15 for example). Increase the index into the slot map (from 106 to 107). The slot (Label D01) found at EEPROM address 107 is the direction the device is capable of overhanging. The number of slots it overhangs depends on the width (X) parameter stored in the device VPD and the pitch (X) between connectors on the backplane. Note however that this convention only assumes the larger 'feature' PCI device can only infringe on slots in one direction.

Referring to the model of the A_B solid previously described above, it can be seen that implementing the 'virtual-solid' but not the 'virtual-envelope' has still helped in this case. If the A$_{-B}$ solid were plugged into slot C15, at a minimum, the SM software would indicate slot D01 is 'not-available' since an interference was detected.

It is also contemplated according to the invention, that the SM software could show slot D01 to be an available slot for a 'short' PCI card. There is a specified standard maximum 'length' (Y coordinate in this case) for short-PCI cards and the A$_{-B}$ solid provides the depth (Y) of the B portion of the solid, so the SM code could make this distinction. This type of 'implied' virtual-envelope (and implied virtual-solids) could sometimes be used successfully when rigid standards exist for a class of devices.

Figure 6A:
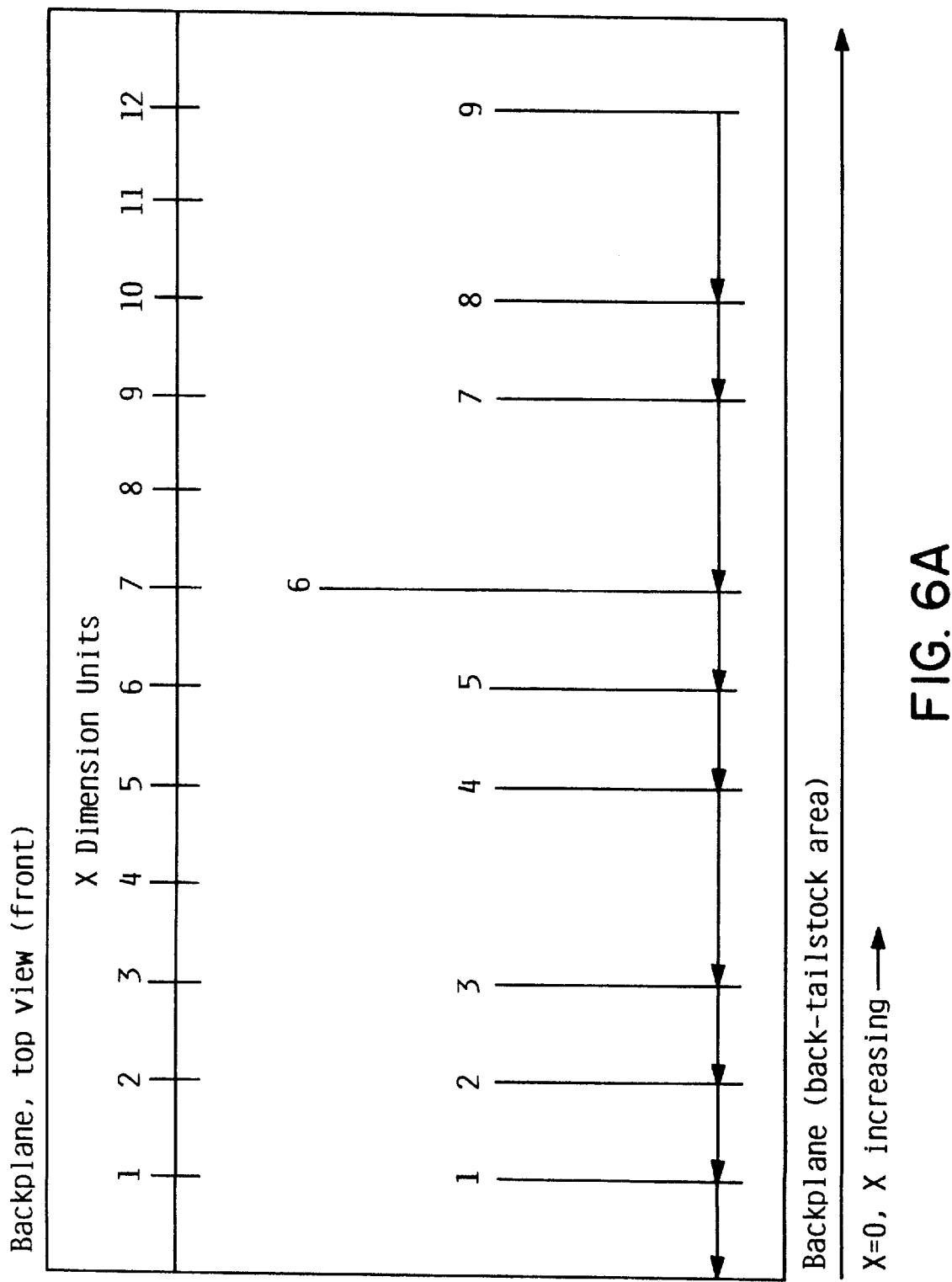
FIG. 6 present a diagram and associated table for illustrating a second example of an implementation according to an exemplary embodiment of the invention.

To illustrate the second example, refer to FIG. 6. Note in this case as long as the device volume axis is defined with respect to the same datum and axis on the connector (connector centerline for instance), then both the −X and +X device interference can be determined. The 'origin displacement' (−X) and the 'adjacency-displacement' (+X) are stored in the backplane EEPROM and stored as a parametric of each slot in the slot-map.

If one of the connectors was reversed by 180 degrees, the "−X" and "+X" parameters could be changed so "−X" is actually a positive integer and "+X" was a negative one (with respect to) the device axis, assuming it cannot change.

Another possibility would be to include two bits to represent device rotation (i.e., 0, 90, 180, 270) in degrees. Note that other designs could include the "Y" coordinate if interferences are expected in that direction by having both the "X" and "Y" coordinate be referenced to the connector datums using chosen backplane datum and axis.

The above provides a detailed disclosure of how volumetric VPD can be implemented for both the device and device bay. Other variations are possible within the spirit and scope of the invention, as would be apparent to one skilled in the art, and these are considered to be covered by the invention defined in the claims.

At least some portions of the invention can be embodied as a computer program product. A computer program product includes a recording medium, such as a floppy disk, a high-capacity read only memory in the form of an optically read compact disc or CD-ROM, a tape, a transmission type media, such as a digital or analog communications link, or a similar computer program product.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

For example, although the above described embodiments use rectangular device volumes, other device volumes could be used within the spirit of the invention. For example, spherical or cylindrical device volumes could be used. In the case of spherical volumes, a polar coordinate schema could be used such that a single point (origin) and vector length could be used to define the sphere. Where only a portion of sphere defines the volume, such as a hemisphere, additional bytes of data could specify the percentage or fraction of the sphere defining the volume.

Besides physical extent, under certain circumstances it may be advantageous to specify by volumetric parameters such things as electrostatic or electromagnetic field strengths. It could be that a device that produces a potentially interfering field should not be placed within a certain distance of another device which is sensitive to such a field, and the above-described volumetric parameters are applicable to such circumstances.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. In an electrical system having a connector board with at least one electrical connector thereon for receiving an electrical device therein, a method comprising:
   storing volumetric vital product parametric data in memory associated with the connector board; and
   accessing the stored volumetric vital product parametric data with the electrical system.

2. The method according to claim 1, wherein the storing volumetric vital product parametric data comprises:
   storing information about dimensional characteristics of the connector board and the at least one electrical connector.

3. The method according to claim 2, wherein the dimensional characteristics comprise at least one of:
   height information;
   width information;
   length information; and
   rotational information, including at least one of:
      roll information;
      pitch information; and
      yaw information.

4. The method according to claim 3, further comprising:
   storing volumetric vital product parametric data in memory associated with the electrical device; and
   accessing from the electrical device the stored volumetric vital product parametric data with the electrical system.

5. The method according to claim 2, wherein there are a plurality of connectors on the connector board, and wherein the storing dimensional characteristics comprises:
   storing a respective associated available connector clearance for each of the plurality of connectors, the available connector clearance being dependent on characteristics of the connector board and one or more electrical device connected thereto.

6. The method according to claim 1, wherein the electrical system includes a chassis with at least one chassis slot for receiving an electrical chassis device therein, a chassis device including a power supply device or a cooling device, and wherein the method further comprises:
   storing volumetric vital product parametric data in memory associated with the at least one chassis slot; and
   accessing the stored volumetric vital product parametric data with the electrical system.

7. The method according to claim 6, wherein the storing volumetric vital product parametric data comprises:
   storing information about dimensional characteristics of the at least one chassis slot.

8. The method according to claim 7, wherein the dimensional characteristics comprise at least one of:
   height information;
   width information;
   length information; and
   rotational information, including at least one of:
      roll information;
      pitch information; and
      yaw information.

9. The method according to claim 6, wherein the storing volumetric vital product parametric data comprises:
   storing information about dimensional characteristics of an electrical chassis device.

10. The method according to claim 9, wherein the dimensional characteristics of an electrical chassis device comprise at least one of:
    height information;
    width information;
    length information; and
    rotational information, including at least one of:
       roll information;
       pitch information; and
       yaw information.

11. An apparatus comprising:
    at least one electrical connector for receiving an electrical device; and first memory associated with the at least one connector for storing volumetric vital product parametric data.

12. The apparatus according to claim 11, wherein the at least one connector has an electrical device received therein;

wherein the apparatus further comprises second memory associated with the received electrical device for storing volumetric vital product parametric data about the electrical device; and wherein the first memory is operable to receive and store volumetric vital product parametric data about the electrical device read from the second memory.

13. In a computer system having an operating system and having a chassis with at least one chassis slot for receiving a chassis electrical device, at least one backplane having at least one backplane slot for receiving a backplane electrical device, an apparatus which provides respective chassis, backplane, and device volumetric data, comprising:

chassis specific memory for storing chassis slot volumetric vital product data;

backplane slot volumetric vital product data memory disposed on the at least one backplane; and device volumetric vital product data memory disposed on a respective electrical device received in one of the respective slots;

wherein each respective memory stores respective volumetric data accessible by the computer system to check spatial compatibility.

14. The apparatus according to claim 13, wherein the computer system has a system power control network which can access the respective volumetric data from the respective memory.

15. The apparatus according to claim 13, wherein the computer system operating system stores hard-coded chassis, backplane, and device volumetric data; and wherein volumetric data from an external data source can be accessed and compared with the computer to check compatibility using one of:

the hard-coded chassis, backplane, or device volumetric data stored in the operating system; or parametric data accessed from respective chassis slot volumetric vital product data memory, respective backplane slot volumetric vital product data memory, and respective device volumetric vital product data memory.

16. The apparatus according to claim 15, wherein the external data source comprises a remote computer data base.

17. The apparatus according to claim 16, wherein the remote computer data base comprises a site on the Internet.

18. The apparatus according to claim 15, wherein the volumetric data comprises at least one of:

height information;

width information;

length information; and rotational information, including at least one of:

roll information;

pitch information; and yaw information.

19. The method according to claim 1, wherein the volumetric vital product data is configured according to a Point-Method.

20. The method according to claim 1, wherein the volumetric vital product data is configured according to a Vector-Method.

21. The method according to claim 1, wherein the volumetric vital product data is configured according to a Displacement-Method.

22. In an electrical system having a connector board with at least one electrical connector thereon for receiving an electrical device therein, a method comprising:

storing volumetric vital product parametric data in memory associated with the connector board, wherein the storing volumetric vital product parametric data comprises storing information about dimensional characteristics of the connector board and the at least one electrical connector, wherein the dimensional characteristics comprise at least one of:

height information;

width information;

length information; and rotational information, including at least one of:

roll information;

pitch information; and yaw information;

accessing the stored volumetric vital product parametric data with the electrical system;

storing volumetric vital product parametric data in memory associated with the electrical device; and accessing from the electrical device the stored volumetric vital product parametric data with the electrical system, wherein the volumetric vital product data includes soft dimensional information about any dynamic properties of the at least one electrical connector and the at least one electrical device, the dynamic properties including at least a movable mounting arrangement.

* * * * *